United States Patent
Carlson, Jr. et al.

(10) Patent No.: US 6,951,595 B2
(45) Date of Patent: *Oct. 4, 2005

(54) POLYESTER FILM LAMINATE WITH ENHANCED IMPACT AND TEAR RESISTANCE AND METHOD FOR ITS PRODUCTION

(75) Inventors: Charles David Carlson, Jr., Columbus, NC (US); Russell Scott Foxhall, Lyman, SC (US)

(73) Assignee: Mitsubishi Polyester Film, LLC, Greer, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/804,518

(22) Filed: Mar. 19, 2004

(65) Prior Publication Data

US 2004/0175576 A1 Sep. 9, 2004

Related U.S. Application Data

(63) Continuation of application No. 09/782,554, filed on Feb. 13, 2001, now Pat. No. 6,713,185.
(60) Provisional application No. 60/182,304, filed on Feb. 14, 2000.

(51) Int. Cl.[7] .................. B32B 31/04; B32B 31/12; B32B 27/36; B32B 7/02
(52) U.S. Cl. ............... 156/256; 156/250; 156/259; 156/260; 156/263; 156/264; 156/269; 156/271; 156/297; 156/299; 156/300; 156/301; 156/302; 156/308.2; 428/426; 428/105; 428/480; 428/910

(58) Field of Search ................ 428/426, 105, 428/486, 910, 480; 156/199, 250, 256, 259, 264, 297, 299, 300, 301, 302, 260, 263, 269, 271, 308.2; 264/288.4, 289.3, 290.2

(56) References Cited

U.S. PATENT DOCUMENTS

| | | | | |
|---|---|---|---|---|
| 4,439,260 A | * | 3/1984 | Canterino et al. | 156/259 |
| 4,474,634 A | * | 10/1984 | Hiraoka et al. | 156/244.13 |
| 4,475,971 A | * | 10/1984 | Canterino | 156/163 |
| 5,091,258 A | * | 2/1992 | Moran | 428/437 |
| 5,350,471 A | * | 9/1994 | Planeta | 156/156 |
| 5,618,630 A | * | 4/1997 | Benoit et al. | 428/500 |
| 5,626,944 A | * | 5/1997 | Rasmussen | 428/172 |
| 6,284,344 B1 | * | 9/2001 | Barnes et al. | 428/98 |
| 6,713,185 B2 | * | 3/2004 | Carlson et al. | 428/426 |

* cited by examiner

Primary Examiner—Vivian Chen
(74) Attorney, Agent, or Firm—Dority & Manning, P.A.

(57) ABSTRACT

A method of forming a reinforced polymer film structure is disclosed that includes the steps of slitting a biaxially oriented polymer film web having a top face and a bottom face into a first portion and a second portion, identifying the first portion and the second portion, and placing the first portion atop the second portion, such that the bottom face of the first portion is adjacent the top face of the second portion. This structure provides an impact and tear resistant laminate. Also disclosed is a method of forming a polymer film structure by identifying a molecular orientation direction profile of two portions of biaxially oriented polymer film and layering the two portions such that a molecular orientation direction profile of one does not coincide with a molecular orientation direction profile of the other.

10 Claims, 1 Drawing Sheet

Extinction angle profile

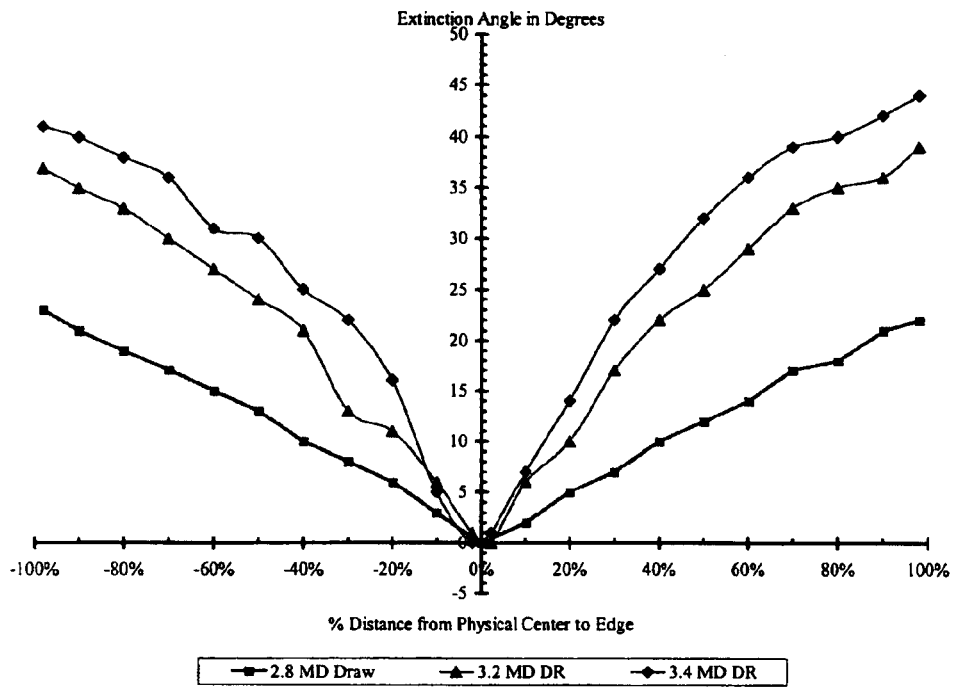
Figure 1. Extinction angle profile
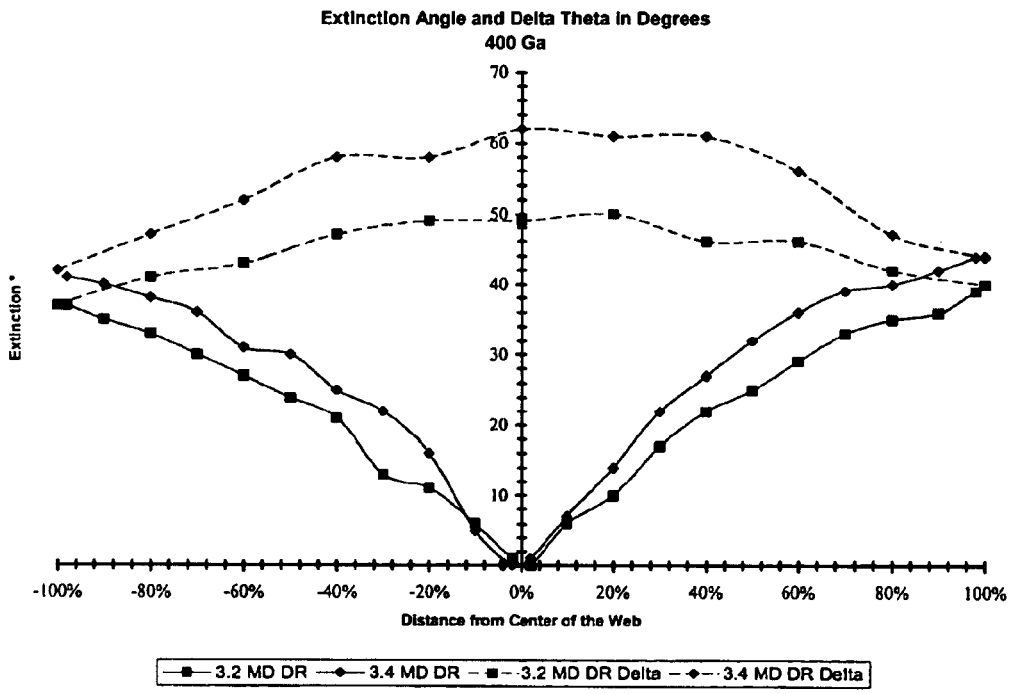
Figure 2. Extinction angle and delta $\theta$ profile

POLYESTER FILM LAMINATE WITH ENHANCED IMPACT AND TEAR RESISTANCE AND METHOD FOR ITS PRODUCTION

This application is a continuation of application Ser. No. 09/782,554, filed Feb. 13, 2001, U.S. Pat. No. 6,713,185, which claims benefit of U.S. Provisional Application No. 60/182,304, filed Feb. 14, 2000.

BACKGROUND OF THE INVENTION

1. Field of the Invention

The present invention relates generally to a method of forming impact and tear resistant film, and the film produced thereby. More particularly, the present invention is directed to a commercially viable process for producing a laminated film having excellent impact resistant and tear resistant properties.

2. Description of Related Art

Impact resistant safety films are commercially available for use where reinforcement is desired, particularly for uses such as protective glazings. For such applications, single-layer or multiple-layer films are adhered to glass sheets, typically on the inside portion of the glazing facing the occupants. Glazing protected with safety films include, but are not limited to, window glass, shower doors, display cases and the like. Safety films are adhered to the glass via various adhesives standard in the industry, and such application of film may be in the so-called "daylight" method in which the film is applied to the glass face without additional anchoring (with or without "catch bars"), or, preferably, the film is used in conjunction with a framing system designed to hold the film in the frame in the event of glass breakage. Such films (and associated framing systems) limit damage and injury to occupants and materials interior to the protected structure when the glass is impacted exteriorly by storm-borne debris, attempted forced penetration during robberies, or pressure waves associated with bomb blast or explosion due, for example, to terrorist activities. In glazed structures unprotected by safety films, glass shards enter the interior of the structure when impacted by debris or blasts and shower the occupants with the glass "spall" resulting in serious injury or death. In addition, if the unprotected glass is broken during a storm, water and wind damage to the interior of the structure and its contents results in significant loss of use and high replacement and repair costs. With glazing protected by safety films (either single-layer or multiple-layer (laminated) films), the spalling effect is eliminated or significantly reduced by the adherence of the shattered glass to the film. If used in conjunction with framing systems, penetration of the glazing into the interior of the structure can be eliminated or curtailed to the point that no injury to occupants or damage to property occurs. Studies have shown direct correlation between tear resistance of films and film laminates, and impact/blast resistance of the glazing structures using safety films and film laminates. Other studies have also shown that multiple-layer safety films (laminates) perform better than single-layer films of the same thickness with respect to film tear properties. Tear resistant films have a wide variety of applications, from packaging to video, and any other film application in which enhanced resistance to tearing is beneficial.

Safety films are preferably transparent, to permit them to be used with glass for glazing applications or other transparent end products. Consequently, polymer films have been found to be well-suited to this use. Safety films are often themselves laminated structures, formed of multiple layers of polymer film, whether unslit or slit. Such multiple layers typically provide greater thickness and consequently, greater impact and tear resistance, than single thickness films. However, as the number of layers increases, the clarity of the film decreases, making the film less desirable for glazing use. The cost of higher numbers of layers, and the resulting thickness, can also be limitations. Thus, safety film laminates having excellent impact resistance and tear resistance with a minimum of layers are desirable.

Cross-laminated films are known. In such films, two or more webs of film are solely or primarily uniaxially oriented. The webs are then crossed at right angles so that the primary direction of orientation of the two films is also at (or nearly at) right angles to one another. The intersecting portion of the two films can then be removed from the webs and used. However, such piecing of the web is not commercially practical. It creates short web segments that may not be useful in automated operations. It requires substantial labor to turn, laminate and cut the film. Uniaxially oriented film is also more prone to tearing and more difficult to work with than biaxially oriented film. A method of forming a laminated film that is free of one or more of these limitations is desirable.

BRIEF SUMMARY OF THE INVENTION

Accordingly, it is an object of the present invention to a provide a laminated safety film and a method of forming laminated safety film having enhanced impact resistance.

It is a further object of the present invention to provide a laminated safety film that has enhanced tear resistance.

It is another object of the present invention to provide an economical method for forming an enhanced impact resistant or tear resistant laminated web from a single biaxially oriented web.

It is yet another object of the present invention to provide a safety film that is substantially transparent.

It is a further object of the present invention to provide a safety film composed of few, preferably two, discrete film layers.

The present invention has accomplished these objectives by providing in a preferred embodiment a method of forming a reinforced polymer film structure that includes slitting a biaxially oriented polymer film web having a top face and a bottom face into a first portion and a second portion of substantially equal width, identifying the first portion and the second portion and overlaying the first portion atop the second portion, such that the bottom face of the first portion is adjacent the top face of the second portion. A method of forming a polymer film structure is also disclosed that includes identifying a molecular orientation direction profile of two portions of biaxially oriented polymer film, and layering the two portions such that a molecular orientation direction profile of one does not coincide with a molecular orientation direction profile of the other. Preferred film structures are also disclosed.

BRIEF DESCRIPTION OF DRAWINGS

FIGS. 1 and 2 show comparative graphs of extinction angle values.

DETAILED DESCRIPTION OF THE INVENTION

The present invention discloses a unique and commercially viable method of forming a laminated safety film that has consistent, predictable, improved performance. Its uniform resistance to impact and tearing are substantially increased in comparison to commercially available films.

The methods of the present invention encompass the use of two or more portions of a biaxially oriented polymer web. A laminate is formed by overlaying these web portions, which have different molecular orientation direction profiles. This unique laminate ensures that at most or all points across it the molecular orientation (and hence the direction of preferred tear) will not be aligned in the two or more layers (or in any two adjacent layers). This provides a reinforced film having superior performance.

This discovery is based on a utilization of the unique molecular orientation pattern created in a polymer film during biaxial orientation. The crux of the process is based on the fact that in any sequentially-stretched biaxially oriented film, an "optical bow" is formed during stretching whereby the molecular orientation direction (also denoted as the extinction angle or θ) varies nearly linearly from near 0 degrees at the center of the web to about 17 to 45 degrees at the chain edge (see FIG. 1). The direction of tearing at any point on the film corresponds closely to this bow angle. Thus, if two films from opposite sides of the web are laminated by overlaying one half of the web onto the other without inverting either of the webs (or after inverting both), the preferred direction of tearing of the individual layers are in opposition or not aligned so that the composite structure does not easily tear (the layers fight each other). The ideal laminate would have a Δθ of about 90 degrees across the entire structure. From a manufacturing perspective, such a structure would require highly customized orientation mechanisms that are not commercially available. The present invention discloses a way of maximizing Δθ in a viable commercial manufacturing context.

In addition, the present inventors have also discovered that process changes may be made to standard base film production to increase the extinction angle at the edge, thereby increasing Δθ. The shape of the extinction angle variation across the web can also be influenced so that a greater portion of the web has extinction angles that are desirable for this application—in which the concavity of the extinction angle curve is more negative. This change in concavity can be seen clearly in FIG. 1 by comparing the lower curve with the two upper curves being preferred objects of this invention. FIG. 2 shows an example of the non-linear extinction angle variation compared with the standard product, as well as the Δθ for both products. Δθ values of about 40 to about 60° are preferred for use herein.

As mentioned above, it has been found that the preferred tear direction of the film is substantially along the optical bow. Therefore, the direction of molecular orientation reflects the weakest direction of the film with respect to tear behavior of the film. It has also been discovered that a direction of about 90 degrees from the direction of molecular orientation is the most tear-resistant direction of the film.

A preferred embodiment of the present invention employs a single sequentially biaxially oriented polymer web, ideally a polyester web. It is preferred that the web be stretched to a substantially equal degree in both directions (e.g., approximately three times its original dimensions). The single web is slit approximately down its center, equidistant from its two uncut edges, to form two portions of substantially equivalent width. Either of the two portions is then placed on top of the other, maintaining the relative top and bottom surfaces in (or changing and then returning them to) their original alignment. What was originally the top face of one original web portion will be adjacent to (preferably laminated to) the bottom face of the other original web portion. If one of the webs were inverted so that the original bottom face of one portion was then adjacent to the original bottom face of the other, the molecular orientation directions of the overlapping layers would track one another. This would not provide the improved resistance to tearing and impact, because the combined layers would have the same tendency to tear along the common optical bow. On the other hand, when one half of the web is in essence shifted over atop the other, the difference in molecular orientation of the two adjacent layers is maximized from a practical standpoint at any point across the structure. This relative orientation permits proper offset of the molecular orientation direction of the two film portions without generating substantial waste across the web.

A further benefit of such a method is that it can be practiced easily on a commercial scale to form continuous webs of wide width reinforced film. Instead of a start and stop process whereby portions of uniaxially oriented web are placed across other uniaxially oriented film to generate a cross lamination having gaps in at least one of the layers at frequent intervals, this process permits two wide widths of the same or different biaxially oriented film to be stacked and laminated in a continuous in-line or offline process.

In alternate embodiments, if even further enhanced tear and impact resistance is required, narrower portions slit from opposing sides of the film nearer the edges of the film can be created and overlayed, maintaining the original bottom face of one adjacent to the original top face of another. The enhanced benefit of such laminates are based on an evaluation of the changing direction of molecular orientation across the optical bow of the web.

In each of the foregoing methods, identification occurs of the molecular orientation direction profile, or at least of the source and spatial orientation of the film portion to be laminated. This identification is necessary to assemble properly the laminates of the present invention. If no such identification occurs, the goals of the present invention cannot be consistently and reliably achieved. Such identification can occur through various means. If lamination is done immediately after the web is slit, the manufacturing apparatus can be set up to direct the slit webs into a stacked assembly in the proper orientation. Alternately, the slit web portions can be rolled with a specific face consistently outside or inside. The portions can be labeled to identify that they came from the left or right of the film, for example, or that they came from the second portion from the left of the web. This permits an operator to later assemble two or more rolls into position. Edge markings can be made on the film to distinguish top and bottom, left and right of the finished roll. Slitting identifiers can be used to distinguish the slit edge from the outside edge of a film portion. Tags, labels, wraps, imprints, uncoated areas, coated areas and the like can all be used to mark web portions for identification. All of the foregoing indications are collectively referred to as labels herein.

In addition, the methods of the present invention can alternatively be practiced by inspecting and identifying the optical bow of slit film portions, and creating laminates thereby.

The foregoing types of identification will also allow construction of laminates with more than two layers which have the properties of the desired invention. For example, if the two halves of the web are labeled "A" and "B", then a three layer laminate possessing the desired impact and tear resistance can be constructed with alternating "A" and "B" layers as "A-B-A" or "B-A-B", provided the original relative orientation is maintained or restored. However, "A-B-B" and other such laminates are also within the purview of the present invention, provided two layers having non-aligned optical bows are used. Where "C" is a layer of unidentified or random molecular orientation, an "A-C-B" laminate is also within the scope of the present invention; the non-aligned layers need not be immediately adjacent to one another. Similarly, laminates with more than three layers can be constructed following the alternating pattern given above.

Polymer Film

For the preferred films and methods of the present invention, a polymer film substrate is most useful. It provides a lightweight, substantially transparent, inexpensive, inert, disposable or recyclable substrate that accommodates many of the end uses of safety films. In addition, the coated polymer film can also easily be laminated by heat bonding or by adhesives to various other substrates, including glass or polymeric plates marketed as glass substitutes.

The films and methods of the present invention can employ any polymeric film capable of biaxial orientation. For example, the present invention is applicable to polymeric films such as those made from polyamides exemplified by nylon; polyolefins such as polypropylene and polyethylene; polyester such as polyethylene terephthalate; polyacetal; polycarbonate; and the like. The invention is particularly applicable to polyester, most preferably polyethylene terephthalate, polyethylene naphthalate or polybutylene terephthalate. The present invention is also applicable to polymeric films including copolyesters such as polyethylene terephthalate isophthalate. A preferred process for forming a base film is set forth in U.S. Pat. No. 5,350,601 to Culbertson et al., incorporated herein by reference. Generally, any polyester film based on a polymer resulting from polycondensation of a glycol or diol with a dicarboxylic acid (or its ester equivalents) such as terephthalic acid, isophthalic acid, sebacic acid, malonic, adipic, azelaic, glutaric, suberic, succinic acids and the like, or mixtures of two or more of the foregoing, are preferred for use in the present invention. Suitable glycols include ethylene glycol, diethylene glycol, polyethylene glycol, and polyols such as propanediol, butanediol and the like. Mixtures of two or more of the foregoing are also suitable.

Any of the above base polymer films can contain conventional additives such as antioxidants, delusterants, pigments, fillers such as silica, calcium carbonate, kaolin, titanium dioxide, antistatic agents and the like, or mixtures thereof, all of which are well known in the art. Conventional coatings can be used with the films of the present invention. For example, coatings containing pigments or dyes, other colorants, stabilizers, antistatic agents, adhesion promoters and the like can be coated onto the films of the present invention.

In addition, for certain end uses, the base polymer film may be a coextruded polyester composite. Any of the various methods for film coextrusion of orientable polymers may be employed to produce the coextruded base films.

The films may be produced and oriented by any of the many known techniques in the art. For example, polyester is typically melted and extruded as an amorphous sheet onto a polished revolving casting drum to form a cast sheet of the polymer. The sheet is quickly cooled and then stretch oriented in one and then the other direction to impart strength and toughness to the film. The sheet is typically stretched from about two to about four times the original cast sheet dimension, in one or both directions. Generally, stretching occurs in a temperature range from about the second order transition temperature of the polymer to below the temperature at which the polymer softens and melts. Where necessary, the film is heat treated after stretching to "lock-in" the properties by further crystallizing the film. The crystallization imparts stability and good tensile properties to the film. Such heat treatment for polyester film is generally conducted at about 190° C. to about 240° C.

Composites Using these Films

As discussed above, the safety films and methods of forming such films of the present invention are not limited to use as described in the preferred embodiments. The method of lamination of films may be employed in the production of safety glass laminates by first laminating the polyester film and then sandwiching the resulting laminate between two pieces of monolithic glass using a standard method of safety glass construction. Those skilled in the art will recognize that the benefits afforded by safety glass over single piece monolithic glass will potentially be further enhanced by application of the methods of the present invention to the polyester film layer between the glass layers.

Alternate composites in which reinforcement may be desirable with such materials as metals, polymeric articles and the like can be used according to the teachings of the present invention. Furthermore, it is envisioned that polymer films of the present invention can also be applied to other surfaces, including irregular surfaces, to provide reinforcement to those surfaces. The film may be heat bonded, coextruded with or adhered to the surface, or can be mechanically attached via fasteners, clips and the like. The film's enhanced tear resistance is also beneficial for more typical applications in which the film is not laminated to substrates.

While surface modification of the base polymer film is not required, such modification can be used with the base polymer films according to the present invention. Conventional surface modification techniques include corona treatment, which is the most common and most preferred procedure for modifying the surface of the polymer base film. Corona treatment can be used to enhance adhesion and reduce blocking of unfilled film during winding, among other things. Corona treatment of about 1.0 watt per square foot per minute is typically sufficient to achieve the desired results.

Beneficial Process Modifications

As discussed above, it has been found that certain process modifications can be made to heighten the optical bow in the oriented polymer film and enhance the benefits of the present invention.

It is preferred that the laminated film have a width of greater than about 50 inches, or alternatively greater than about 30 inches. Such films are preferably run in lengths of about 5000 feet to about 10,000 feet. It is preferred that the $\Delta\theta$ be from about 40 degrees to about 60 degrees (or greater) for such wide web applications.

Sequentially biaxially oriented film production process variables including, but not limited to, machine direction draw ratio (MDDR), transverse direction draw ratio (TDDR), transverse direction draw temperature ($T_d$), machine and transverse draw rate of deformation (or, equivalently, strain rate) have been found to have effect on the optical bow.

For example, by increasing MDDR starting from an MDDR of about 2.8, and with all other process variables remaining fixed, one can obtain significant increase in maximum bow angle at the film edge until a local optimum MDDR of about 3.4 is achieved. Further increases in MDDR above this local optimum MDDR typically result in a film that is so structurally changed (for example, more highly crystalline) after stretching in the first direction that a decrease in maximum bow angle at the film edge from the local optimum is observed, and an increase in film breaks and splits will result when stretching in the second (transverse) direction. Thus, a machine direction draw ratio of about 2.8 to about 3.4 is preferred. A machine direction draw ratio of about 3.1 to about 3.4 is alternately preferred.

Similar effects are found by varying the transverse direction draw temperature, $T_d$. Increasing $T_d$ will result in an increase in maximum optical bow angle (with all other process variables fixed) up to an optimum temperature after which process interruptions (film breaks and splits) occur with increasing frequency. $T_d$ of about 80 to about 120 degrees C. are preferred. Alternately, $T_d$ of about 95 to about 110 are preferred.

Those skilled in the art will recognize that processing conditions which maximize bow angle while maintaining process robustness will be to a degree machine-dependent, but that the list of process variables which effect bow angle are universal.

EXAMPLES

Examples 1–9

Poly(ethylene) terephthalate resin was extruded into sheet form and sequentially biaxially stretched. Variations in machine direction draw ratio (MDDR) and transverse direction stretch temperature ($T_d$) were made to demonstrate preferred embodiments of this invention.

Example 1 establishes a baseline optical bow at a machine direction draw ratio of 3.2 and a transverse direction stretch temperature of 101 degrees C. (SOC). Example 4 and Example 7 demonstrate the effect of increased transverse stretching temperature on the maximum bow angle (and, by simple computation) the associated $\Delta\theta$. Example 2, as well as Example 5 and Example 8, demonstrate the enhancing effects of this invention by varying first MDDR and then $T_d$ as well, with both variables at or below those optimum values above which process stability and robustness is effected, as described above. Example 3 (as well as Example 6 and Example 9) are examples which show that increasing MDDR above a machine-dependent optimum will result in a decrease in maximum bow angle at the edge. This, the resulting biaxially oriented film and corresponding laminate will not exhibit the enhanced $\Delta\theta$ of films of this invention.

Table 2 shows numerically the effect of increasing $T_d$ on the bow angle, by comparing values of two examples. The top figures indicate the two examples being compared The last number in each column is the arithmetic sum of all bow angle changes (by position in the webs) with positive values reflecting increased bow angles as per this invention.

Table 3 shows numerically the effect on the bow angle profiles across the webs of varying both MDDR and $T_d$. As with Table 2, the top figures indicate the two examples being compared. The last number in each column is the arithmetic sum of all bow angle changes (by position in the webs) with positive values reflecting bow angle modifications as taught in this invention.

The present invention having been thus described with particular reference to the preferred forms and embodiments thereof, it will be obvious to one of ordinary skill in the art that various changes and modifications may be made therein without departing from the spirit and scope of the invention as defined in the appended claims.

TABLE 1

| % Distance from Physical Center to Edge | Ex 1 | Ex 2 | Ex 3 | Ex 4 | Ex 5 | Ex 6 | Ex 7 | Ex 8 | Ex 9 |
|---|---|---|---|---|---|---|---|---|---|
| −98% | 37 | 40 | 31 | 37 | 41 | 34 | 38 | 42 | 34 |
| −90% | 34 | 40 | 28 | 36 | 40 | 31 | 36 | 42 | 32 |
| −80% | 32 | 40 | 26 | 34 | 40 | 30 | 34 | 41 | 32 |
| −70% | 29 | 38 | 25 | 30 | 38 | 28 | 33 | 40 | 30 |
| −60% | 27 | 35 | 28 | 26 | 36 | 27 | 29 | 38 | 26 |
| −50% | 23 | 30 | 22 | 22 | 30 | 22 | 24 | 34 | 19 |
| −40% | 19 | 28 | 18 | 18 | 27 | 18 | 18 | 30 | 18 |
| −30% | 15 | 22 | 13 | 15 | 22 | 12 | 16 | 24 | 16 |
| −20% | 11 | 18 | 6 | 10 | 16 | 11 | 10 | 17 | 13 |
| −10% | 5 | 12 | 6 | 7 | 10 | 9 | 4 | 10 | 5 |
| 0% | 1 | 2 | 2 | 1 | 2 | 3 | 0 | 2 | 2 |
| 10% | 4 | 4 | 1 | 3 | 5 | 0 | 3 | 4 | 2 |
| 20% | 8 | 12 | 6 | 9 | 12 | 7 | 9 | 13 | 8 |
| 30% | 12 | 18 | 8 | 13 | 20 | 9 | 12 | 20 | 12 |
| 40% | 17 | 23 | 11 | 18 | 26 | 13 | 17 | 27 | 16 |
| 50% | 21 | 28 | 16 | 21 | 30 | 18 | 22 | 30 | 22 |
| 60% | 24 | 32 | 20 | 25 | 34 | 21 | 25 | 34 | 26 |
| 70% | 27 | 35 | 23 | 29 | 37 | 25 | 30 | 37 | 29 |
| 80% | 30 | 37 | 25 | 31 | 37 | 29 | 31 | 39 | 32 |
| 90% | 31 | 38 | 31 | 33 | 38 | 34 | 33 | 39 | 34 |
| 98% | 34 | 38 | 34 | 36 | 39 | 36 | 36 | 40 | 36 |
| MD DR | 3.2 | 3.4 | 3.6 | 3.2 | 3.4 | 3.6 | 3.2 | 3.4 | 3.6 |
| TD Stretch Temp | SOC | SOC | SOC | SOC + 4 | SOC + 4 | SOC + 4 | SOC + 8 | SOC + 8 | SOC + 8 |

TABLE 2

| % Distance from Physical Center to Edge | 1–4 | 2–5 | 3–6 | 4–7 | 5–8 | 6–9 | 1–7 | 2–8 | 3–9 |
|---|---|---|---|---|---|---|---|---|---|
| −98% | 0 | 1 | 3 | 1 | 1 | 0 | 1 | 2 | 3 |
| −90% | 2 | 0 | 3 | 0 | 2 | 1 | 2 | 2 | 4 |

TABLE 2-continued

| % Distance from Physical Center to Edge | 1–4 | 2–5 | 3–6 | 4–7 | 5–8 | 6–9 | 1–7 | 2–8 | 3–9 |
|---|---|---|---|---|---|---|---|---|---|
| −80% | 2 | 0 | 4 | 0 | 1 | 2 | 2 | 1 | 6 |
| −70% | 1 | 0 | 3 | 3 | 2 | 2 | 4 | 2 | 5 |
| −60% | −1 | 1 | −1 | 3 | 2 | −1 | 2 | 3 | −2 |
| −50% | −1 | 0 | 0 | 2 | 4 | −3 | 1 | 4 | −3 |
| −40% | −1 | −1 | 0 | 0 | 3 | 0 | −1 | 2 | 0 |
| −30% | 0 | 0 | −1 | 1 | 2 | 4 | 1 | 2 | 3 |
| −20% | −1 | −2 | 5 | 0 | 1 | 2 | −1 | −1 | 7 |
| −10% | 2 | −2 | 3 | −3 | 0 | −4 | −1 | −2 | −1 |
| 0% | 0 | 0 | 1 | −1 | 0 | −1 | −1 | 0 | 0 |
| 10% | −1 | 1 | −1 | 0 | −1 | 2 | −1 | 0 | 1 |
| 20% | 1 | 0 | 1 | 0 | 1 | 1 | 1 | 1 | 2 |
| 30% | 1 | 2 | 1 | −1 | 0 | 3 | 0 | 2 | 4 |
| 40% | 1 | 3 | 2 | −1 | 1 | 3 | 0 | 4 | 5 |
| 50% | 0 | 2 | 2 | 1 | 0 | 4 | 1 | 2 | 6 |
| 60% | 1 | 2 | 1 | 0 | 0 | 5 | 1 | 2 | 6 |
| 70% | 2 | 2 | 2 | 1 | 0 | 4 | 3 | 2 | 6 |
| 80% | 1 | 0 | 4 | 0 | 2 | 3 | 1 | 2 | 7 |
| 90% | 2 | 0 | 3 | 0 | 1 | 0 | 2 | 1 | 3 |
| 98% | 2 | 1 | 2 | 0 | 1 | 0 | 2 | 2 | 2 |
|  | 13 | 10 | 37 | 6 | 23 | 27 | 19 | 33 | 64 |

TABLE 3

| % Distance from Physical Center to Edge | 1–2 | 2–3 | 4–5 | 5–6 | 7–8 | 8–9 | 1–5 | 1–8 |
|---|---|---|---|---|---|---|---|---|
| −98% | 3 | −9 | 4 | −7 | 4 | −8 | 4 | 5 |
| −90% | 6 | −12 | 4 | −9 | 6 | −10 | 6 | 8 |
| −80% | 8 | −14 | 6 | −10 | 7 | −9 | 8 | 9 |
| −70% | 9 | −13 | 8 | −10 | 7 | −10 | 9 | 11 |
| −60% | 8 | −7 | 10 | −9 | 9 | −12 | 9 | 11 |
| −50% | 7 | −8 | 8 | −8 | 10 | −15 | 7 | 11 |
| −40% | 9 | −10 | 9 | −9 | 12 | −12 | 8 | 11 |
| −30% | 7 | −9 | 7 | −10 | 8 | −8 | 7 | 9 |
| −20% | 7 | −12 | 6 | −5 | 7 | −4 | 5 | 6 |
| −10% | 7 | −6 | 3 | −1 | 6 | −5 | 5 | 5 |
| 0% | 1 | 0 | 1 | 1 | 2 | 0 | 1 | 1 |
| 10% | 0 | −3 | 2 | −5 | 1 | −2 | 1 | 0 |
| 20% | 4 | −6 | 3 | −5 | 4 | −5 | 4 | 5 |
| 30% | 6 | −10 | 7 | −11 | 8 | −8 | 8 | 8 |
| 40% | 6 | −12 | 8 | −13 | 10 | −11 | 9 | 10 |
| 50% | 7 | −12 | 9 | −12 | 8 | −8 | 9 | 9 |
| 60% | 8 | −12 | 9 | −13 | 9 | −8 | 10 | 10 |
| 70% | 8 | −12 | 8 | −12 | 7 | −8 | 10 | 10 |
| 80% | 7 | −12 | 6 | −8 | 8 | −7 | 7 | 9 |
| 90% | 7 | −7 | 5 | −4 | 6 | −5 | 7 | 8 |
| 98% | 4 | −4 | 3 | −3 | 4 | −4 | 5 | 6 |
|  | 129 | −190 | 126 | −163 | 143 | −159 | 139 | 162 |

What is claimed is:

1. A method of forming a polymer film structure comprising:

identifying a molecular orientation direction profile of two portions of film cut from biaxially oriented polymer film;

layering said two portions such that a molecular orientation direction profile of one does not coincide with a molecular orientation direction profile of the other.

2. The method of claim 1, wherein said molecular orientation direction profile is identified by identifying an attribute of said portions selected from the group consisting of a top face, a bottom face, a first formed edge, a second formed edge, a first slit edge, a second slit edge, an optical bow or combinations thereof.

3. The method of claim 2, wherein said attribute is identified by rolling said film.

4. The method of claim 2, wherein said attribute is identified by a label.

5. The method of claim 1, wherein said portions are slit from a single full sheet.

6. The method of claim 5, wherein said single full sheet is slit approximately down its center.

7. The method of claim 1, wherein at least one of said portions includes polyester.

8. The method of claim 1, wherein only two portions are used.

9. The method of claim 1, further comprising the step of forming a composite structure comprising said film structure and glass.

10. The method of claim 9, further comprising interposing an adhesive layer intermediate said film structure and said glass.

* * * * *